(12) United States Patent
Koyama

(10) Patent No.: US 7,470,854 B2
(45) Date of Patent: Dec. 30, 2008

(54) ELECTRONIC MUSIC APPARATUS

(75) Inventor: Masahiro Koyama, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 227 days.

(21) Appl. No.: 10/927,284

(22) Filed: Aug. 25, 2004

(65) Prior Publication Data
US 2005/0045026 A1    Mar. 3, 2005

(30) Foreign Application Priority Data
Aug. 25, 2003   (JP)   ............................... 2003-208613

(51) Int. Cl.
*G10H 1/08* (2006.01)
(52) U.S. Cl. .............................. 84/625; 84/660; 84/697; 84/698
(58) Field of Classification Search .................. 84/625, 84/660, 697, 698; 381/119
See application file for complete search history.

(56) References Cited

U.S. PATENT DOCUMENTS 5,250,745 A * 10/1993 Tsumura .................. 434/307 A
5,856,628 A    1/1999 Noguchi et al.
2001/0055401 A1* 12/2001 Yamada et al. .............. 381/119
2003/0059067 A1    3/2003 Shibata
2006/0090632 A1* 5/2006 Ludwig ...................... 84/645

FOREIGN PATENT DOCUMENTS

JP    2204794    8/1990

* cited by examiner

*Primary Examiner*—David S. Warren
(74) *Attorney, Agent, or Firm*—Morrison & Foerster LLP

(57) ABSTRACT

Electronic music apparatus includes: a tone generator section for generating a tone signal in response to operation of a performance operator unit; an external input section for receiving a tone signal from the outside; a mixer section for generating mixed tone signals by mixing the tone signal generated by the tone generator section and the tone signal received via the external input section; an external output section for outputting the tone signal, generated by the tone generator section, to the outside before that tone signal is mixed with the tone signal received via the external input section; and an audio output section for audibly outputting the mixed tone signals from the mixer section. Because the tone signal received via the external input section is not fed to the external output section, no unwanted howl is produced even where a plurality of the electronic music apparatus are connected together.

8 Claims, 2 Drawing Sheets

ELECTRONIC MUSIC APPARATUS

BACKGROUND OF THE INVENTION

The present invention relates generally to electronic music apparatus which generate tones in response to performance operation by human players. More particularly, the present invention relates to an improved electronic music apparatus which is suitable for use in, for example, music therapy etc., and which, in an application where the electronic music apparatus is connected with one or more other electronic music apparatus of a similar construction, allows the respective users of the music apparatus to execute desired performance operation and simultaneously listen to tones generated in response to their performance operation.

There have been known electronic music apparatus, for example, from Japanese Patent Application Laid-open Publication No. HEI-10-031482 which corresponds to the U.S. Pat. No. 5,856,628. The known electronic music apparatus each include a performance operator unit, a tone generator for generating tone signals in response to performance operation, by the user or human operator, on the performance operator unit, external input section, external output section, speaker output section, and mixer circuitry. The tone signals generated by the tone generator and externally received via the external input section are mixed via the mixer circuitry, and the resultant mixed tone signals are supplied not only to the speaker output section but also to an external device located outside the electronic music apparatus in question.

Recently, music therapy (i.e., treatment of a physical problem or illness based on music) has been employed extensively in medical facilities etc. Some of the music therapy utilizes musical instrument performances, where rehabilitation and/or the like of a patient is carried out by the patient and healer (or care taker, such as a facilitator) individually performing musical instruments to communicate with each other via the instrument performances. As one example of the musical instrument, an electronic music apparatus may be suitably used for music therapy in medical facilities, which is small in size for convenient portability and has a headphone set etc. capable of effectively preventing leakage therethrough of sounds to other persons than the user of the music apparatus due to limitations on its installed position, necessity to minimize noise sounds and so on. In a case where such small-size electronic music apparatus with the respective headphone sets are to be used by a plurality of users, it suffices to connect together these electronic music apparatus via connecting cables in such a manner that each of the users can listen, through the headphone set, to tones performed by that user and by the user of the other music apparatus; namely, the users of the connected music apparatus can listen to each other's performance tones through their respective headphone sets. For example, if the external output section of the first electronic music apparatus is connected to the external input section of the second electronic music apparatus and the external output section of the second electronic music apparatus is connected to the external input section of the first electronic music apparatus, the users of the first and second electronic music apparatus can listen, through their respective headphone sets, to each other's performance tones (i.e., tones performed by the users of the two music apparatus).

However, the external input section of the conventional electronic music apparatus is merely designed to receive tones (audio signals) reproduced via an external audio device or the like, such as a compact disk player, but never designed for use in an application as mentioned above where the external output sections and input sections of a plurality of the electronic music apparatus are connected with each other so that an output from one of the music apparatus is delivered to the other music apparatus. Therefore, it has been very difficult to connect together a plurality of the conventional electronic music apparatus for use in music therapy. Namely, in the case where a plurality of the conventional electronic music apparatus are connected together, each performance tone of the first electronic music apparatus is returned, via the second electronic music apparatus, to the external input section of the first electronic music apparatus, i.e. a closed loop is formed between the first and second electronic music apparatus, which would result in unwanted howls in the outputs from the headphone set; thus, it has been difficult to use the conventional electronic music apparatus in music therapy. Alternatively, arrangements may be made such that each output from the first electronic music apparatus is passed to the second electronic music apparatus and each output from the second electronic music apparatus is divided into two outputs so that the respective users of the first and second electronic music apparatus can listen to the same tones simultaneously. In such a case, a relatively long connecting cable has to be provided to extend from the second electronic music apparatus; however, in medical facilities where music therapy is carried out primarily, laying such a long connecting cable is rather improper in that it may induce troubles and accidents. Namely, because no electronic music apparatus has ever been developed which allows the respective users of that music apparatus and other electronic music apparatus, connected thereto, to simultaneously perform desired tones and simultaneously listen to each other's performances, it is still not possible to appropriately use electronic music apparatus for music therapy etc., which would result in not a few inconveniences.

SUMMARY OF THE INVENTION

In view of the foregoing, it is an object of the present invention to provide an electronic music apparatus which is suitable for use in, for example, music therapy etc., and which, in an application where the electronic music apparatus is connected with one or more other electronic music apparatus of a similar construction, allows each of the users of the apparatus to simultaneously listen to tones generated in response to performance operation by that user and by the users of the other apparatus.

In order to accomplish the above-mentioned object, the present invention provides an electronic music apparatus which comprises: a performance operator unit; a tone generator section that generates a tone signal in response to operation of the performance operator unit; an external input section that receives a tone signal from outside the electronic music apparatus; a mixer section that generates mixed tone signals by mixing the tone signal generated by the tone generator section and the tone signal received via the external input section; an external output section that outputs the tone signal, generated by the tone generator section, to outside the electronic music apparatus before that tone signal is mixed with the tone signal received via the external input section; and an audio output section that audibly outputs the mixed tone signals generated by the mixer section.

According to the present invention, the mixed tone signals, generated by mixing the tone signal generated by the tone generator section in response to operation of the performance operator unit and the tone signal externally received from the outside (i.e., from another electronic music apparatus) via the external input section, are fed to the audio output section, so that the user (i.e., human operator of the performance operator unit) of the electronic music apparatus in question is allowed to listen to tones audibly produced on the basis of the mixed tone signals. The tone signal fed to the external output section, on the other hand, has not been subjected to the mixing with the externally-received tone signal, although generated by the tone generator section. The thus-fed tone signal can then be supplied via the external output section to the other electronic music apparatus. Briefly stated, the present invention is characterized by not feeding the tone signal, received by the external input section, to the external output section.

Thus, even where a plurality of (for example, two) of the electronic music apparatus of the present invention are connected together in such a manner that the external output section of each of the music apparatus is connected with the external input section of the other music apparatus through a wired or wireless connection, no unwanted howl would be produced because of the arrangement that the tone signal, received by the external input section, is not fed to the external output section. Consequently, the users of the connected electronic music apparatus can simultaneously listen to tones generated in response to respective performance operation by the users, with no unwanted howl. As a result, the present invention can provide an improved electronic music apparatus suitable for use in music therapy etc.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION OF THE EMBODIMENTS

Figure 1:
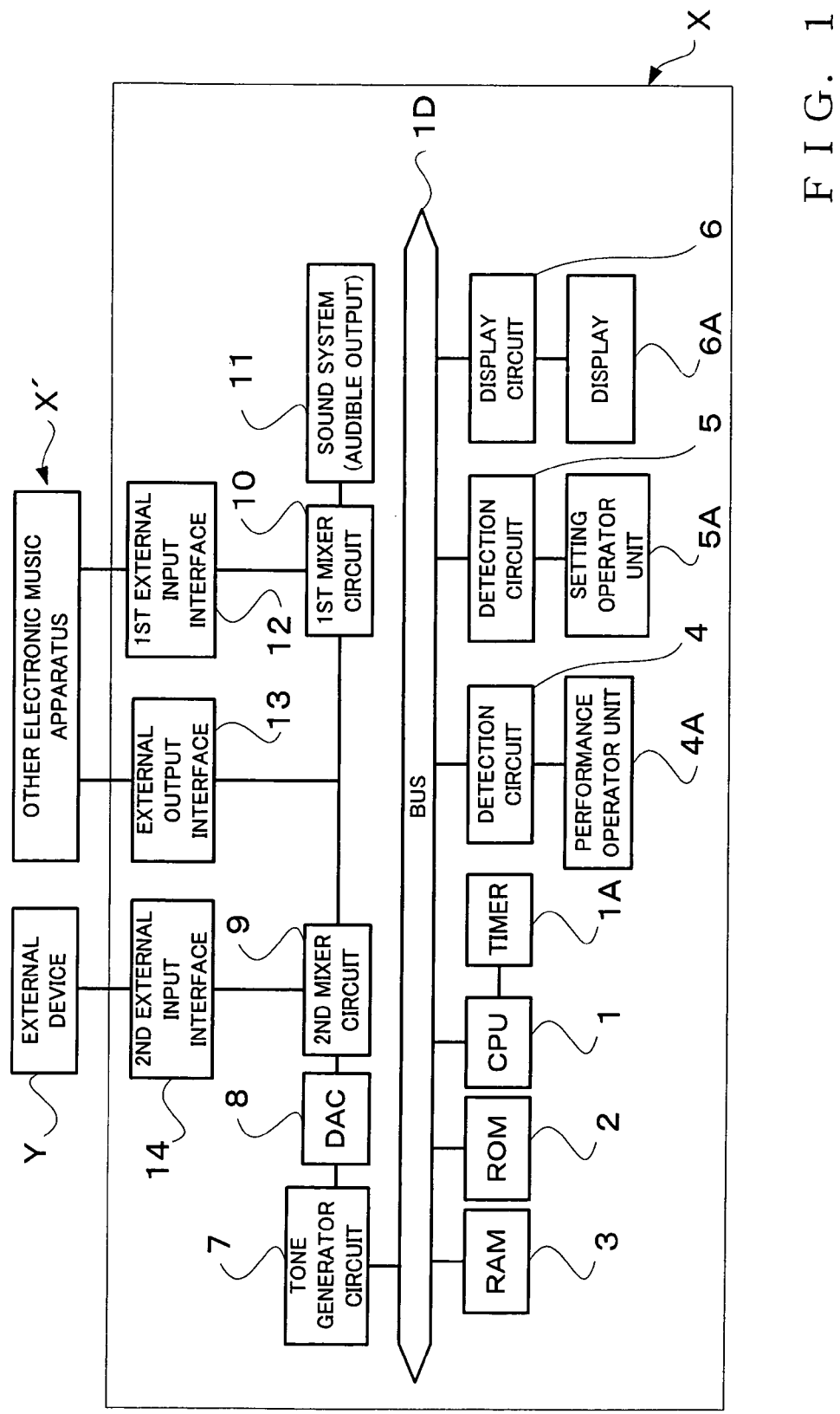
FIG. 1 is a block diagram showing a general hardware setup of an electronic music apparatus in accordance with an embodiment of the present invention.

FIG. 1 is a block diagram showing a general hardware setup of an electronic music apparatus in accordance with an embodiment of the present invention. The electronic music apparatus X of FIG. 1 is a small-size electronic music apparatus having portability particularly suitable for use in music therapy, etc. Namely, the electronic music apparatus X has not only a function as a mere electronic musical instrument which generates tones by itself, but also a function as a medical device which can be connected with at least one similar electronic music apparatus for use in music therapy etc. where rehabilitation of a patient is carried out by the patient and healer (or care taker, such as a facilitator) communicating with each other through music.

The electronic music apparatus X is controlled by a microcomputer comprising a microprocessor unit (CPU) 1, a read-only memory (ROM) 2 and a random-access memory (RAM) 3. The CPU 1 controls behavior of the entire electronic music apparatus X. To the CPU 1 are connected, via a data and address bus 1D, the ROM 2, RAM 3, detection circuits 4 and 5, display circuit 6 and tone generator (T.G.) circuit 7. Also connected to the CPU 1 is a timer 1A for counting various time periods and intervals, for example, to signal interrupt timing for timer interrupt processes. For example, the timer 1A generates clock pulses, which are given to the CPU 1 as processing timing instructions or as interrupt instructions. The CPU 1 carries out various control, in accordance with such instructions, to generate tones, mix tone signals, etc.

The ROM 2 is provided for storing various programs to be executed by the CPU 1 and various data. The RAM 3 is used as a working memory for temporarily storing various data generated as the CPU 1 executes a predetermined program, as a memory for storing the currently-executed program and data related thereto, and for various other purposes. Predetermined address regions of the RAM 3 are allocated and used as registers, flags, tables, memories, etc. Performance operator unit 4A is provided for selecting each tone to be generated; for example, it may be a performance pad unit for audibly generating a tone in response to performance operation by a human player or user of the music apparatus. The performance operator unit 4A can be used not only for a manual performance by the human player but also as input means for entering or setting a performance environment, such as a tone color, into the music apparatus. The detection circuit 4 detects operation (such as pad-hitting or pad-playing operation) performed on the operator unit 4A to thereby produce detection outputs.

Setting operator unit 5A includes various setting switches and operators for setting the electronic music apparatus X, such as tone color setting switches for selecting a tone color of each tone to be generated via the electronic music apparatus X; of course, the setting operator unit 5A may include various other operators. The detection circuit 5 constantly detects respective operational states of the individual operators on the setting operator unit 5A and outputs switch information, corresponding to the detected operational states of the operators, to the CPU 1 via the data and address bus 1D. The display circuit 6 visually displays, on a display device 6A, not only tone color selection information and a performance environment, such as a currently-set tone color, but also a controlling state of the CPU 1. With reference to various information displayed on the display device 6A, the human player can, for example, select, set, ascertain various information about a performance environment with ease.

The tone generator (T.G.) circuit 7, which is capable of simultaneously generating tone signals in a plurality of channels, receives various performance information generated in response to player's manipulation or performance operation on the performance operator unit 4A, and it generates tone signals based on the received performance information. Each of the tone signals thus generated by the tone generator circuit 7 is converted, via a DAC (Digital-to-Analog Converter), from digital representation to analog representation. The thus-converted tone signal is subjected to mixing processing via mixer circuits 9 and 10, and then audibly reproduced or sounded by a sound system 11 (audio output section) including an amplifier and speaker. Volume switch is connected directly to the sound system 11, so that the volume of each tone to be output from the sound system 11 can be controlled in accordance with operation of the volume switch. The tone generator circuit 7 and sound system 11 may be constructed in any conventionally known manner. For example, any desired tone synthesis method may be used in the tone generator circuit 7, such as the FM, PCM, physical model or formant synthesis method. Further, the tone generator circuit 7 may be implemented either by dedicated hardware or by software processing performed by the CPU 1.

The mixer circuits 9 and 10 each mixes a tone signal generated by the above-mentioned tone generator circuit 7 and a tone signal supplied from another electronic music apparatus X' constructed similarly to the electronic music apparatus X or from an external device Y located outside the music apparatus X, to thereby generate mixed tone signals. Specifically, the mixer circuit 9 provided at a stage preceding the mixer circuit 10 performs mixing processing between a tone signal generated by the tone generator circuit 7 and an audio signal supplied from the external device Y via an external input interface 14. The external input interface 14 is connected to the external device Y, such as an audio device like a CD (Compact Disk) or MD (Mini Disk) player, and it inputs, to the music apparatus X, an audio signal or the like reproduced by the external device Y.

The mixer circuit 10 provided at a stage following the mixer circuit 9 performs mixing processing between the mixed signals (or the tone signal generated by the tone generator circuit 7 if no audio signal is input from the external device Y) and a tone signal supplied from the other electronic music apparatus X' via an external input interface 12; the external input interface 12 will be referred to as the first external input interface, while the above-mentioned external input interface 14 will be referred to as the second external input interface. The first external input interface 12 is an input interface (line input section) for inputting the tone signal, generated by a tone generator circuit of the externally-connected other music apparatus X', to the music apparatus X which the interface 12 belongs to. External output interface 13 connected to the other electronic music apparatus X' in combination with the first external input interface 12 is an output interface (line output section) for delivering the tone signal from the tone generator circuit 7 to the other electronic music apparatus X' without mixing the tone signal from the tone generator circuit 7 with the signal received via the first external input interface 12. Namely, the instant electronic music apparatus X is connectable to the other electronic music apparatus X' via the first external input interface 12 and external output interface 13 so as to communicate (transmit/receive) tone signals with (to/from) the other electronic music apparatus X'.

The external device Y may be any form of device as long as it can generate a signal that can be mixed, via the mixer circuit 9, with the tone signal generated by the tone generator circuit 7 of the music apparatus X. However, the external device Y and mixer circuit 9 may be dispensed with.

It is preferable that the first external input interface 12 and the external output interface 13 be constructed integrally as a single terminal unit and the two electronic music apparatus be connected via an integrally-formed connecting cable. For example, the signal terminal unit may be constructed as a stereo terminal unit and the connecting cable may be in the form of a cross-connecting cable so that the external output interface 13 (line output section) of one of the electronic music apparatus can be connected with the first external input interface 12 (line input section) of the other electronic music apparatus.

Further, in the above-described electronic music apparatus of the present invention, the performance operator unit 4A may be of any other type than a percussion instrument type like a performance pad unit, such as a stringed instrument type, wind instrument type, keyboard instrument type or body-attachable type. However, the performance pad unit will prove particularly helpful if used in music therapy etc. because every person can readily execute performance operation using the pad. Furthermore, the electronic music apparatus of the present invention is not limited to the type where the performance operator unit 4A, display device 6A, tone generator circuit 7, etc. are incorporated together as a unit within the body of the electronic music apparatus; for example, the electronic music apparatus may be constructed in such a manner that the above-mentioned components are provided separately and connected via communication facilities such as MIDI interfaces, various networks and/or the like. Moreover, the present invention may be applied to any desired type of equipment other than an electronic musical instrument, such as a personal computer, portable phone or other portable communication terminal, karaoke apparatus or game apparatus.

Figure 2A:
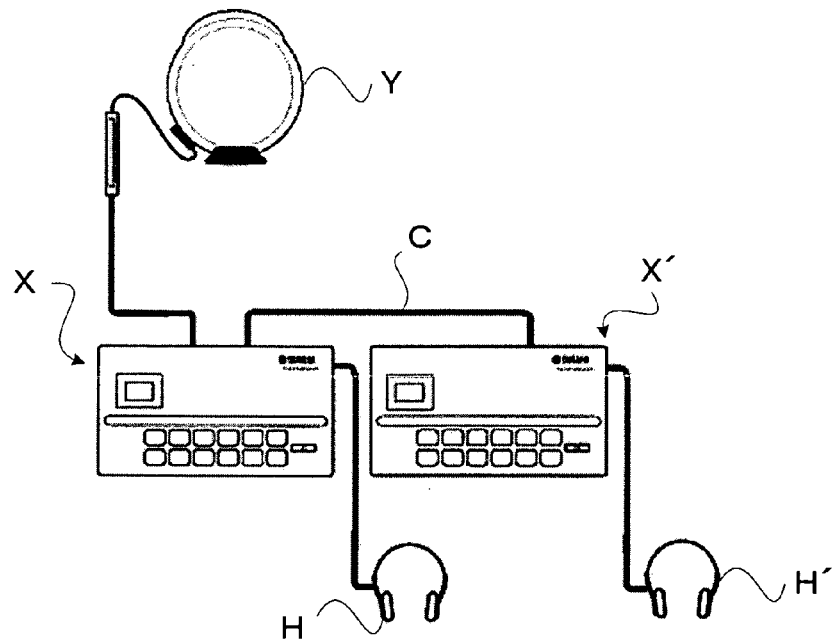
FIG. 2A is a conceptual diagram showing an example form of use of the electronic music apparatus in which the electronic music apparatus is connected with another electronic music apparatus of a similar construction.
Figure 2B:
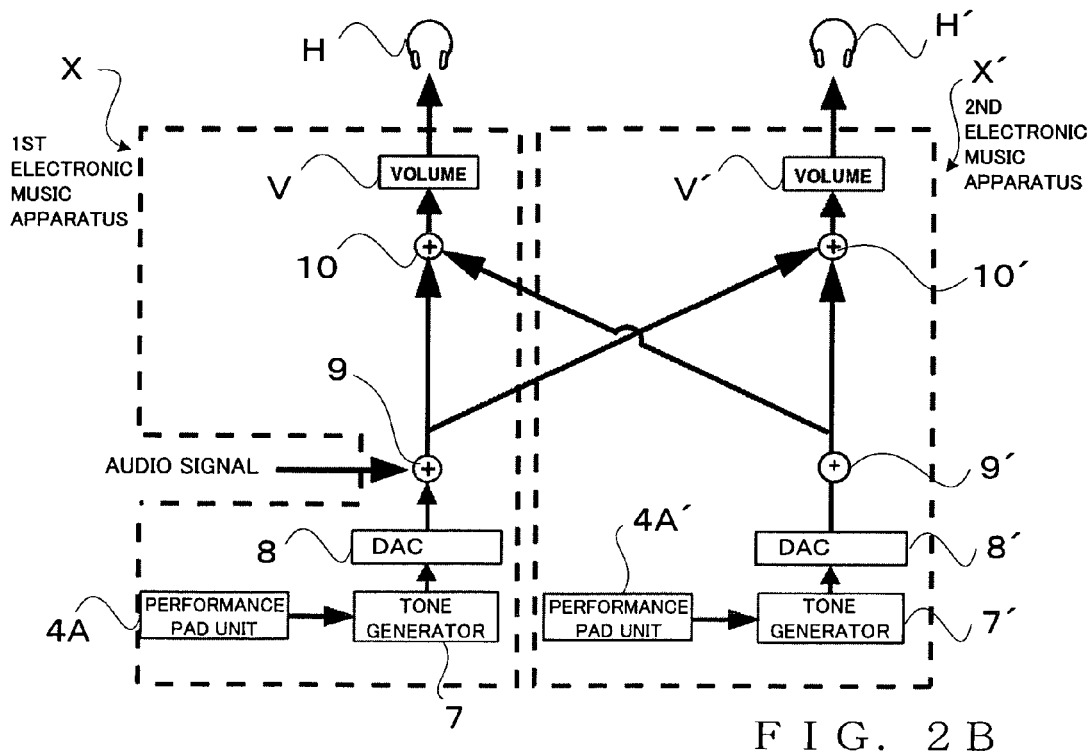
FIG. 2B is a conceptual diagram showing signal flows in the thus-connected electronic music apparatus.

Now, a detailed description will be made about signal processing to be performed in the case where a plurality of the above-mentioned electronic music apparatus are connected for desired use. FIG. 2A and 2B show an example form of use of the electronic music apparatus; specifically, FIG. 2A is a conceptual diagram showing a manner in which the two electronic music apparatus are connected, while FIG. 2B is a conceptual diagram showing signal flows in the thus-connected electronic music apparatus. As noted previously, the electronic music apparatus X has not only the function of a mere electronic musical instrument which generates tones by itself, but also the function of a medical device for use in music therapy etc. by being connected with at least one other electronic music apparatus of a similar construction. Thus, the following paragraphs describe an example in which a plurality of the electronic music apparatus X (X') are connected together to carry out music therapy. For convenience of explanation, one of the connected electronic music apparatus, which is manipulated or operated by a healer or caretaker (such as a facilitator), will hereinafter be referred to as the "first electronic music apparatus X", and the other electronic music apparatus manipulated or operated by a patient will hereinafter be referred to as the "second electronic music apparatus X'". Further, to simplify the explanation, let it be assumed that no audio signal is input from the external device Y (see FIG. 1) to the second electronic music apparatus X' via the second external input interface 14.

The first electronic music apparatus X and second electronic music apparatus X' are connected with each other via the respective first external input interfaces 12 and external output interfaces 13. In FIG. 2A, the first electronic music apparatus X and second electronic music apparatus X' are interconnected, via the first external input interfaces 12 and the external output interfaces 13, using a single connecting cable C. Headphone set H (or H') is attached to each of the electronic music apparatus, so that the healer or caretaker (such as a facilitator) and patient can listen to tones generated from the electronic music apparatus X (X') using the respective headphone sets. In each of the electronic music apparatus X (or X'), as understood from FIG. 2B, a tone signal generated by the tone generator circuit 7 (or 7') and a tone signal received from the other electronic music apparatus X' (or X) via the first external input interface are mixed together via the mixer circuit 10 (or 10'), and the resultant mixed signals are fed to the headphone set H (or H'). The tone signal generated by the tone generator circuit 7 (or 7') is also fed to the external output interface; namely, the tone signal generated by the tone generator circuit 7 (or 7') is also transmitted to the other electronic music apparatus X' (or X) without being mixed, via the mixer circuit 10 (or 10'), with the tone signal received from the other electronic music apparatus X' (or X) via the first external input interface. In this way, the tone signal to be fed to the headphone set H (or H') of the electronic music apparatus X (or X') is made different from the tone signal to be supplied to the other electronic music apparatus X' (or X); namely, the same tone signal is never supplied to the headphone set H (or H') and other electronic music apparatus X' (or X).

Now, with reference to FIG. 2B, a description will be made about signal processing that is performed in accordance with a program for music therapy carried out in an actual site of medical treatment. For example, the facilitator causes the patient to freely touch the performance pad unit 4A' so that the patient can check each tone generated and recognize that various tone colors can be produced, for example, by switching among pads assigned different tone colors (as in a drum kit). Then, the facilitator causes the patient to hit or play the performance pad unit 4A' to a predetermined rhythm. According to the music therapy program, performance operation is mainly performed only by the patient, i.e. only on the second electronic music apparatus X'. In this case, the second electronic music apparatus X' generates tone signals by means of the tone generator circuit 7' in response to playing of the performance pad unit 4A'. Each of the thus-generated tone signals is converted, via the DAC 8', into analog representation and delivered via the mixer circuit 9' to the mixer circuit 10'. Because, in this case, no performance operation is performed by the facilitator on the first electronic music apparatus X, the second electronic music apparatus X' receives no tone signal from the first electronic music apparatus X. Accordingly, the mixer circuit 10' does not perform the mixing processing, so that the converted analog signal is adjusted in volume as-is via a volume control V' and then audibly output via the headphone set H'. The converted analog signal is also transmitted to the first electronic music apparatus X. However, because no performance operation is performed by the facilitator on the first electronic music apparatus X, the tone signal, transmitted from the second electronic music apparatus X', is also audibly output as-is via the headphone set H of the music apparatus X. In this manner, both the facilitator and the patient are allowed to simultaneously listen to the tones, generated in response to the patient's performance operation, via the respective electronic music apparatus.

Subsequently, the facilitator causes the patient to play the performance pad unit 4' with the same rhythm which the facilitator has played the performance pad unit 4A' with. When playing operation has been performed only by the facilitator, each tone signal generated in response to the facilitator's playing operation is transmitted from the first electronic music apparatus X to the second electronic music apparatus X', so that both the facilitator and the patient can simultaneously listen to each tone, generated in response to the facilitator's performance operation, via the respective electronic music apparatus. When playing operation has been performed only by the patient, on the other hand, each tone signal generated in response to the patient's playing operation is transmitted from the second electronic music apparatus X' to the first electronic music apparatus X, so that both the facilitator and the patient can simultaneously listen to each tone, generated in response to the patient's performance operation, via the respective electronic music apparatus.

As a next step, the facilitator causes the patient to play the performance pad unit 4A' to a given music piece. At this step, only the patient may play the performance pad unit 4A', or both the facilitator and the patient may freely play their respective performance pad units 4A and 4A'. Each audio signal, reproduced by the external device in accordance with an instruction from the first electronic music apparatus X, is mixed via the mixer circuit 9 with a tone signal from the tone generator circuit 7, and the resultant mixed signals are transmitted to the second electronic music apparatus X'. When the facilitator has not played or operated the performance pad unit 4A, only the audio signal reproduced by the external device is transmitted to the second electronic music apparatus X', so that the patient can operate the performance pad unit 4A' while listening to a tone generated in the music apparatus X' on the basis of the reproduced audio signal and in accordance with that generated tone. When the patient has operated the performance pad unit 4A', each tone signal generated by the tone generator circuit 7' is transmitted to the first electronic music apparatus X, where the tone signal is mixed, via the mixer circuit 10, with an audio signal reproduced by the external device and the resultant mixed signals are output via the headphone set H. In this manner, both the facilitator and the patient are allowed to simultaneously listen to tones, obtained as a result of merging between the tone generated in response to the patient's performance operation and the tone based on the audio signal reproduced by the external device, via the respective electronic music apparatus.

Also, in the case where the patient is caused to operate the performance pad unit 4A' to a predetermined music piece, the facilitator too may operate the performance pad unit 4A. In such a case, the tone signals, provided by the mixer circuit 9 mixing the tone signal generated in response to the facilitator's operation of the performance pad unit 4A and the audio signal reproduced by the external device, are transmitted to the second electronic music apparatus X', where the transmitted tone signals are mixed, via the mixer circuit 10', with the tone signal generated in response to the patient's operation of the performance pad unit 4A' and the resultant mixed tone signals are audibly output via the headphone set H'. Meanwhile, the tone signal generated in response to the patient's operation of the performance pad unit 4A' is transmitted to the first electronic music apparatus X, where the transmitted tone signal is mixed, via the mixer circuit 10, with the mixed signals provided by the mixer circuit 9 mixing the tone signal generated in response to the facilitator's operation of the performance pad unit 4A and the audio signal reproduced by the external device, so that the signals thus mixed by the mixer circuit 10 are audibly output via the headphone set H. In this manner, both of the facilitator and patient are allowed to simultaneously listen to the tones, obtained as a result of merging of the tones generated in response to the facilitator's and patient's performance operation and the tone based on the audio signal reproduced by the external device, via the respective electronic music apparatus. At a last step, the facilitator causes the patient to relax his or her body.

As described above, the electronic music apparatus of the present invention transmits each tone signal from its tone generator to another electronic music apparatus of a similar construction, and directly receives each tone signal from the tone generator of the other electronic music apparatus. With the arrangement that the tone based on the thus-received tone signal is combined or merged with the tone generated by the electronic music apparatus, the user can listen to the tones, generated by the respective electronic music apparatus, using the headphone set. Thus, the electronic music apparatus of the present invention can be said to be a superior apparatus that is best suited for use in music therapy.

It should also be appreciated that the mixer circuit 9 and second external input interface 14 are not necessarily essential and may be omitted in the above-described embodiment. In such a case, where no audio signal or the like is input via the external device, there are generated tones each based only on a tone signal generated in response to operation, by the human operator or user, on the performance operator unit 4A or based on a mixture of a tone signal and a tone signal input from the other electronic music apparatus X'.

Note that the setting operator unit 5A may include one or more selection switches for setting the electronic music apparatus X of the invention in such a manner that the apparatus generates tones each based only on a tone signal generated in the music apparatus X, or based only on a tone signal input from the other electronic music apparatus X', or based on a mixture of a tone signal generated in the music apparatus X and a tone signal input from the other electronic music apparatus X'.

Whereas the preferred embodiment of the present invention has been described above in relation to the case where two electronic music apparatus are interconnected, three or more such electronic music apparatus may be connected together. In this case, it is only necessary that any one of the connected apparatus includes two or more first external input interfaces (line input sections) 12 and external output interfaces (line output sections) 13; namely, the numbers of the input interfaces 12 and output interfaces 13 may each be one less than the total number of the electronic music apparatus to be connected. Namely, in the case where three or more electronic music apparatus of the present invention are to be connected together, output lines of a plurality of output channels in the external output section of any one of the electronic music apparatus may be connected, through a wired or wireless connection, with input lines of one of a plurality of input channels in the remaining two or more electronic music apparatus.

Also note that the connection between the plurality of the electronic music apparatus is not limited to the wired connection using the connecting cable C etc. as shown in FIG. 2 and may be a wireless connection. If a wireless connection is employed, the electronic music apparatus may be provided with a radio transmitter and receiver. Irrespective of whether the wired connection or the wireless connection is employed, either analog tone signals or digital tone signals may be transmitted and received between the electronic music apparatus. In the case where digital tone signals are transmitted and received, the plurality of the electronic music apparatus may be connected either directly or via a communication network, such as a LAN, Internet or telephone line network.

Further, whereas the preferred embodiment of the invention has been described above in relation to the case where two or more electronic music apparatus are connected together for use in music therapy, the connected music apparatus may be used in musical education, training, etc.

In summary, the electronic music apparatus of the present invention is characterized by supplying a tone signal, generated by its tone generator, to another electronic music apparatus before the generated tone signal is mixed with a tone signal received from the other electronic music apparatus. Such arrangements can achieve the superior benefit that, even where a plurality of the electronic music apparatus are connected together, the respective users of the electronic music apparatus can simultaneously listen to tones generated in response to each other's performance operation, with no unwanted howl.

What is claimed is:

1. A system including an external device and at least first and second electronic music apparatus, each of said first and second electronic music apparatus comprising:
 a performance operator unit;
 a tone generator section that generates a tone signal in response to operation of said performance operator unit;
 a first external input section that receives a tone signal from outside said electronic music apparatus;
 a first mixer that generates mixed tone signals by mixing the tone signal generated by said tone generator section and the tone signal received via said first external input section;
 an external output section that outputs the tone signal, generated by said tone generator section, to outside said electronic music apparatus before the tone signal generated by said tone generator section is mixed with the tone signal received via said first external input section;
 a second external input section configured to receive a tone signal from outside said electronic music apparatus;
 a second mixer provided between said tone generator section and said first mixer, said second mixer mixing the tone signal generated by said tone generator section and the tone signal received by said second external input section if such signal is being received, wherein the tone signals mixed by said second mixer are output to said first mixer and outside said electronic music apparatus via said external outnut section; and
 an audio output section that audibly outputs the mixed tone signals generated by said first mixer,
 wherein said first external input section of the first electronic music apparatus receives, as a tone signal from the outside, the tone signal outputted by said external output section of the second electronic music apparatus,
 said first external input section of the second electronic music apparatus receives, as a tone signal from the outside, the tone signal outputted by said external output section of said first electronic music apparatus, and
 said second external input section of said first electronic music apparatus receives, as a tone signal from the outside, a tone signal generated by said external device.

2. The system as claimed in claim 1 wherein each of said first and second electronic music apparatus further comprises a selector that selects whether or not to audibly output, via said audio output section, the mixed tone signals generated by said first mixer.

3. The system as claimed in claim 2 wherein said selector is capable of selecting any one of the tone signal generated by said tone generator section, the tone signal received by said first external input section and the mixed tone signals generated by said first mixer, and wherein the tone signal or the mixed tone signals selected by said selected are audibly output via said audio output section.

4. The system as claimed in claim 1 wherein said audio output section outputs the tone signals to a headphone set.

5. The system as claimed in claim 1 wherein said performance operator unit includes one or more pad-type operators.

6. The system as claimed in claim 1 wherein said first external input section is arranged so to be capable of receiving tone signals from outside said electronic music apparatus via a plurality of input channels thereof,
 said first mixer generates the mixed tone signals by mixing the tone signal generated by said tone generator section and the tone signals received via said plurality of input channels of said first external input section, and
 said first external, output section is arranged so as to be capable of outputting the tone signal, generated by said tone generator section, via a plurality of output channels thereof.

7. The system as recited in claim 1,
 wherein said external output section of each of said electronic music apparatus is connected, through a wired or wireless connection, with said external input section of other said electronic music apparatus.

8. The system as recited in claim 6,
 wherein output lines of said plurality of output channels in said external output section of any one of said electronic music apparatus are connected, though a wired or wireless connection, with input lines of one of said plurality of input channels in remaining two or more said electronic music apparatus.

* * * * *